Oct. 27, 1964  J. J. GOODRICH  3,153,991
APPARATUS FOR THE MANUFACTURE OF COMPOSITE CARTON BLANKS
Filed March 4, 1963  11 Sheets-Sheet 1
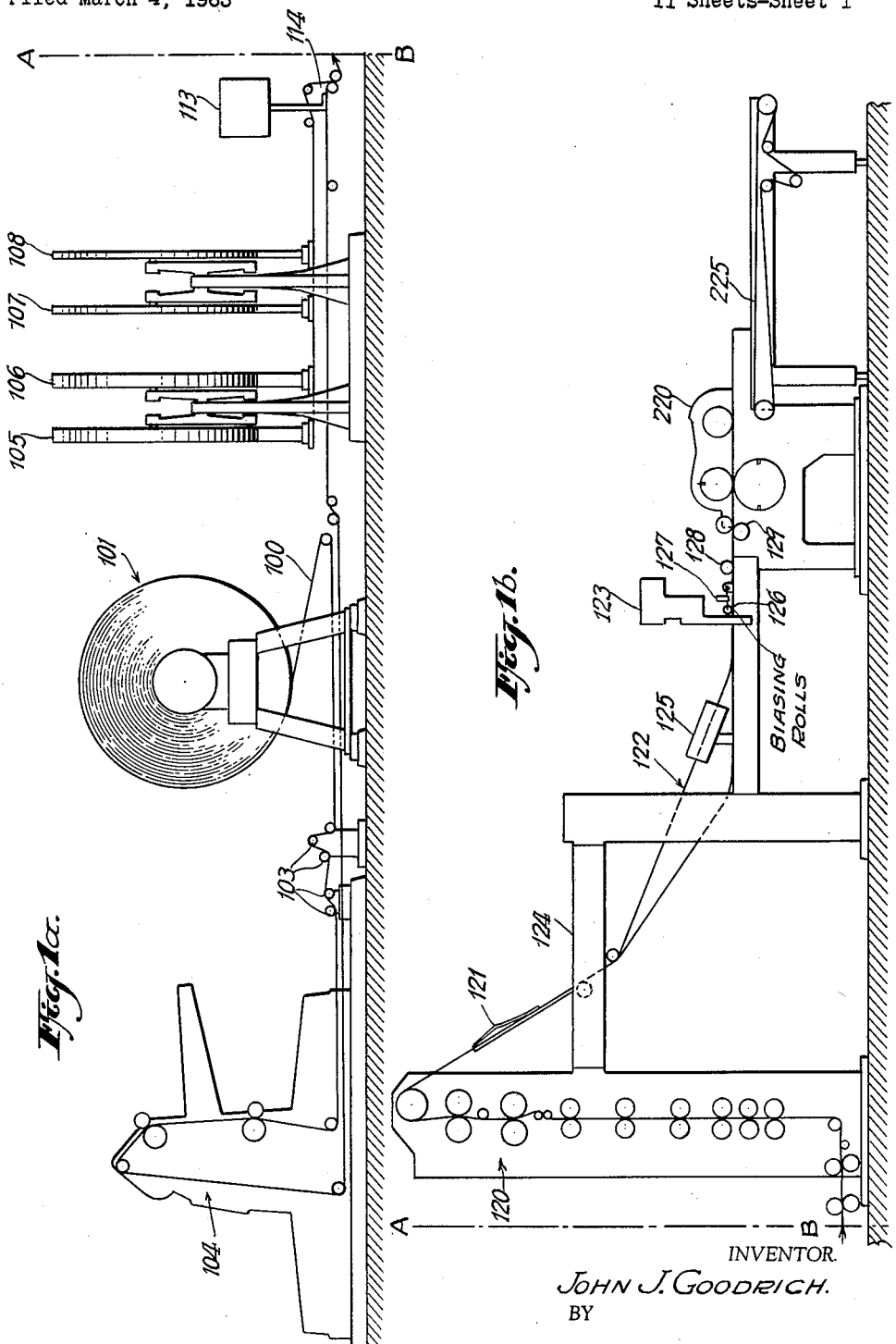
INVENTOR.
JOHN J. GOODRICH.
BY
Ward, Neal, Haselton, Orme & McElhannon
ATTORNEYS.

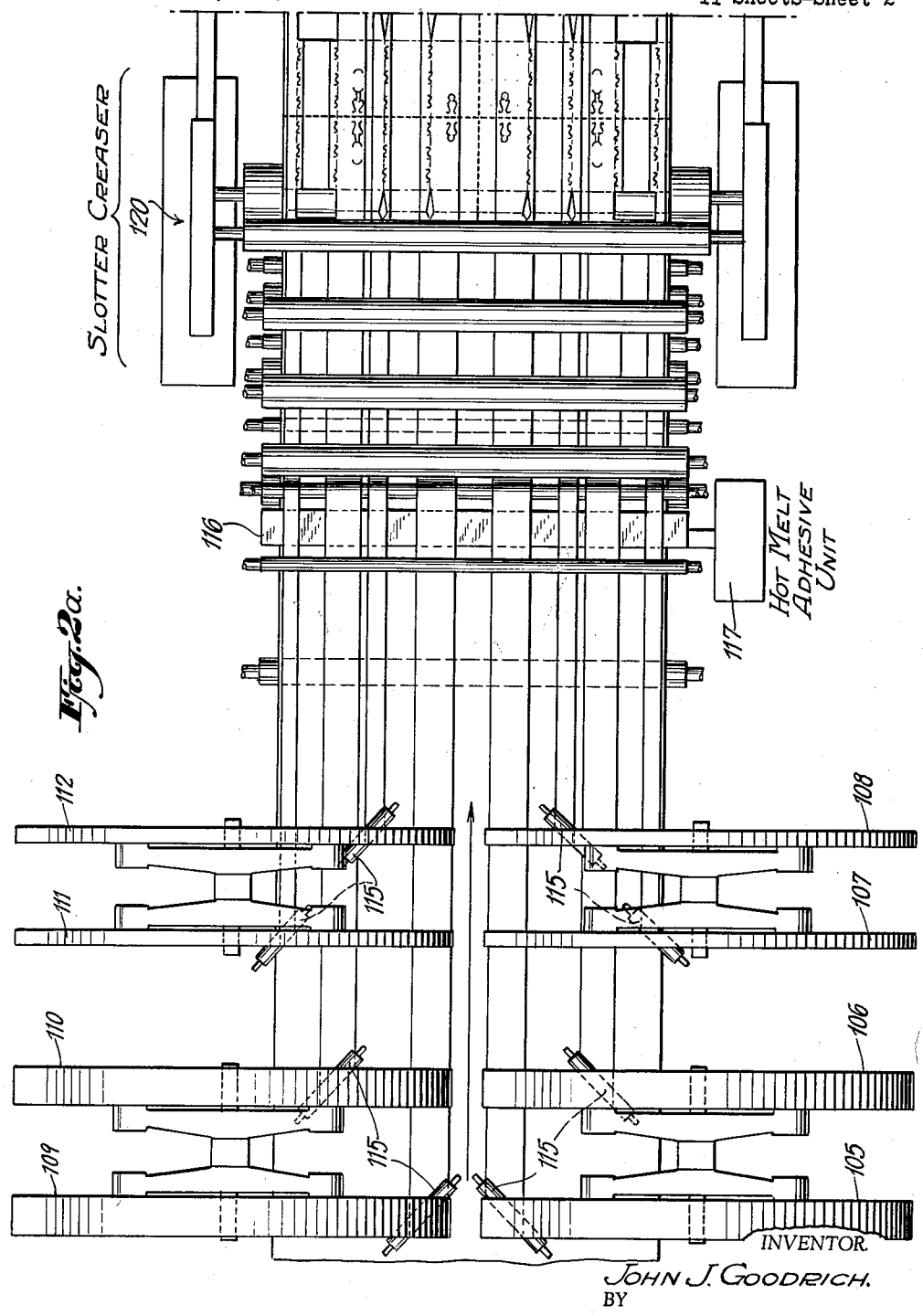

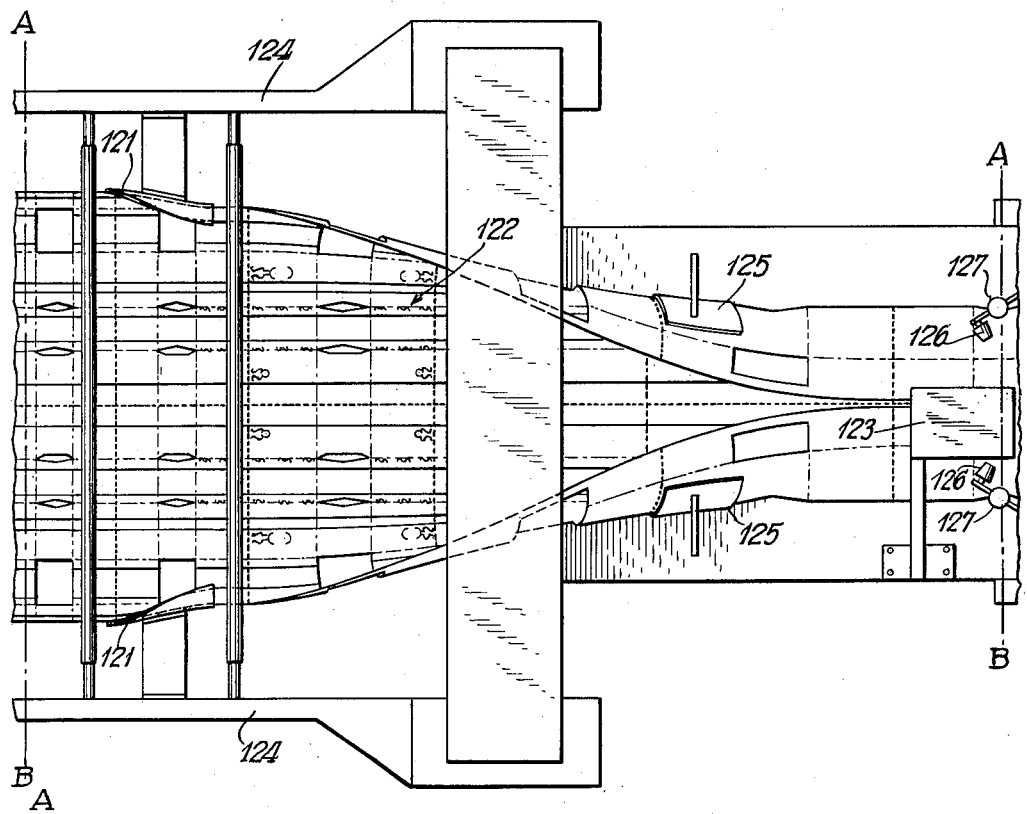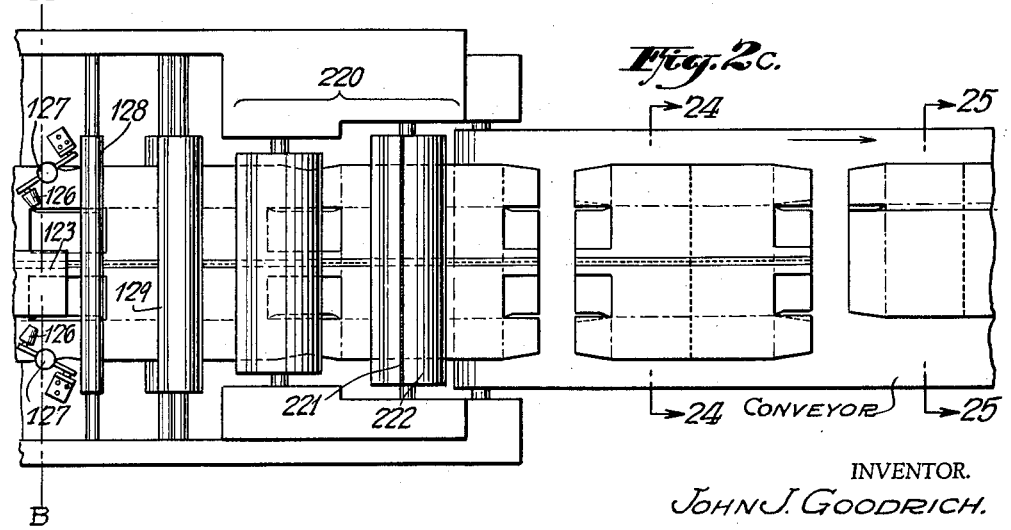

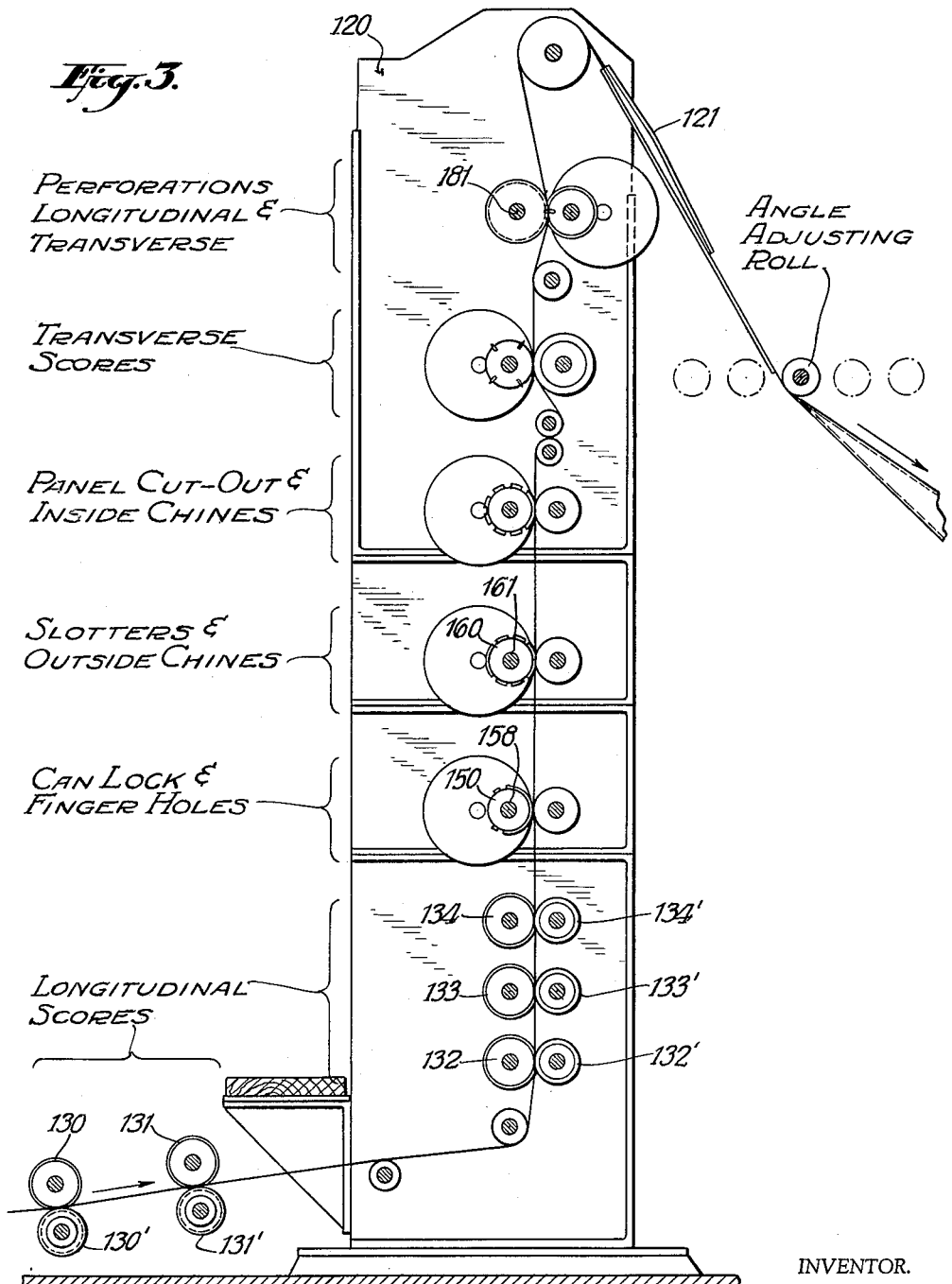

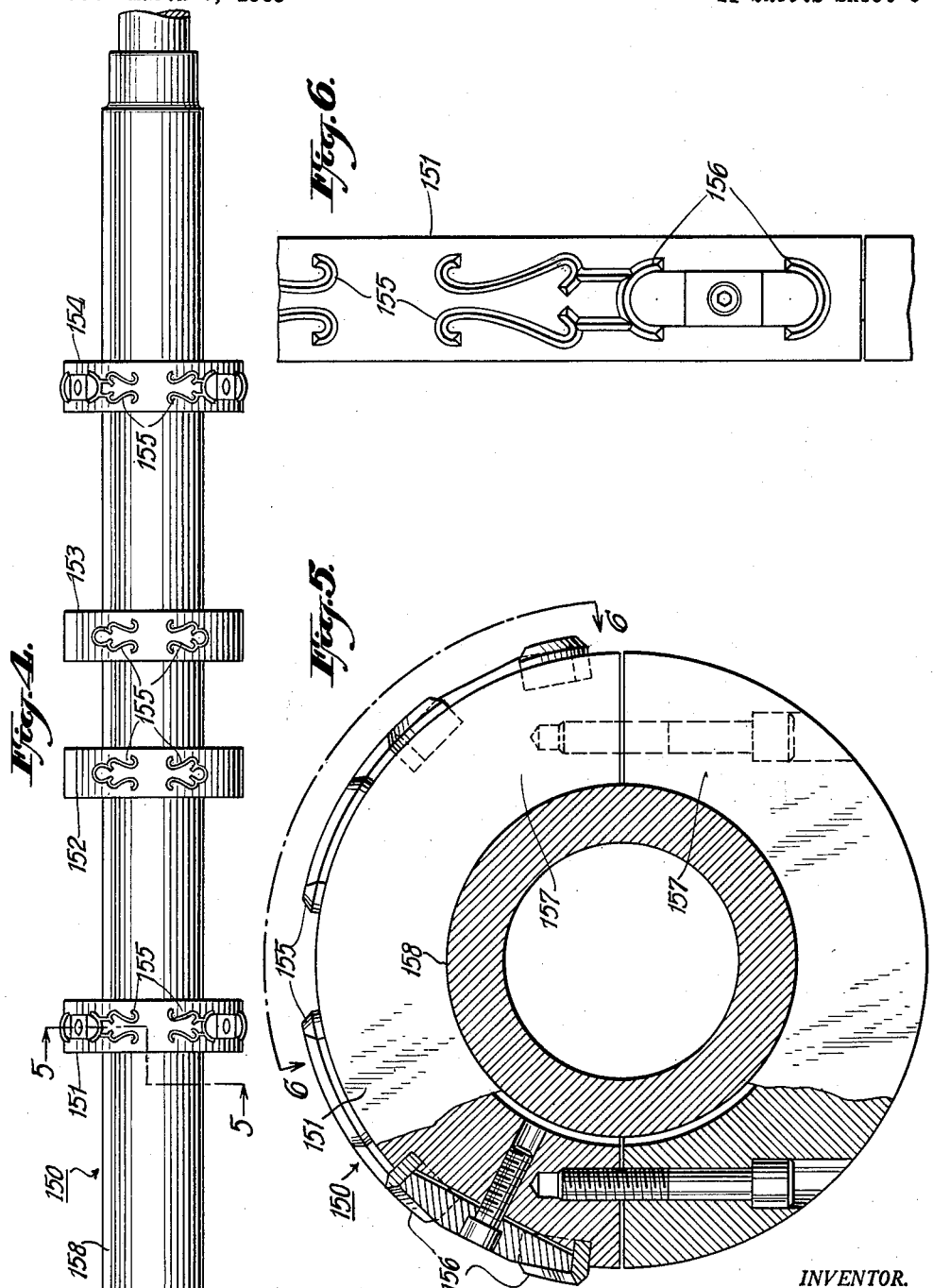

Oct. 27, 1964    J. J. GOODRICH    3,153,991
APPARATUS FOR THE MANUFACTURE OF COMPOSITE CARTON BLANKS
Filed March 4, 1963    11 Sheets-Sheet 6
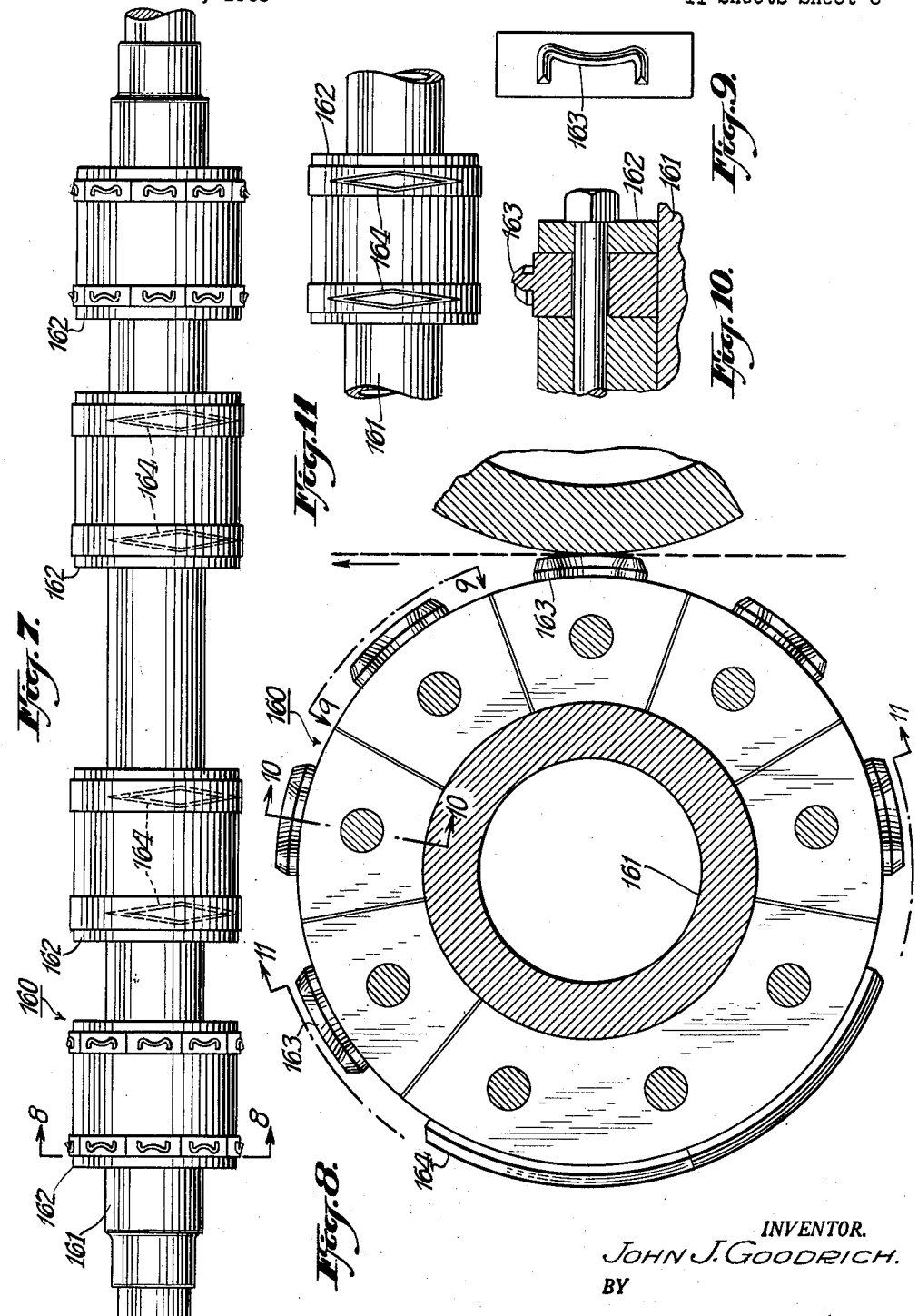
INVENTOR.
JOHN J. GOODRICH.
BY
Ward, Neal, Haselton, Orme & McElhannon
ATTORNEYS.

Oct. 27, 1964     J. J. GOODRICH     3,153,991
APPARATUS FOR THE MANUFACTURE OF COMPOSITE CARTON BLANKS
Filed March 4, 1963     11 Sheets-Sheet 7
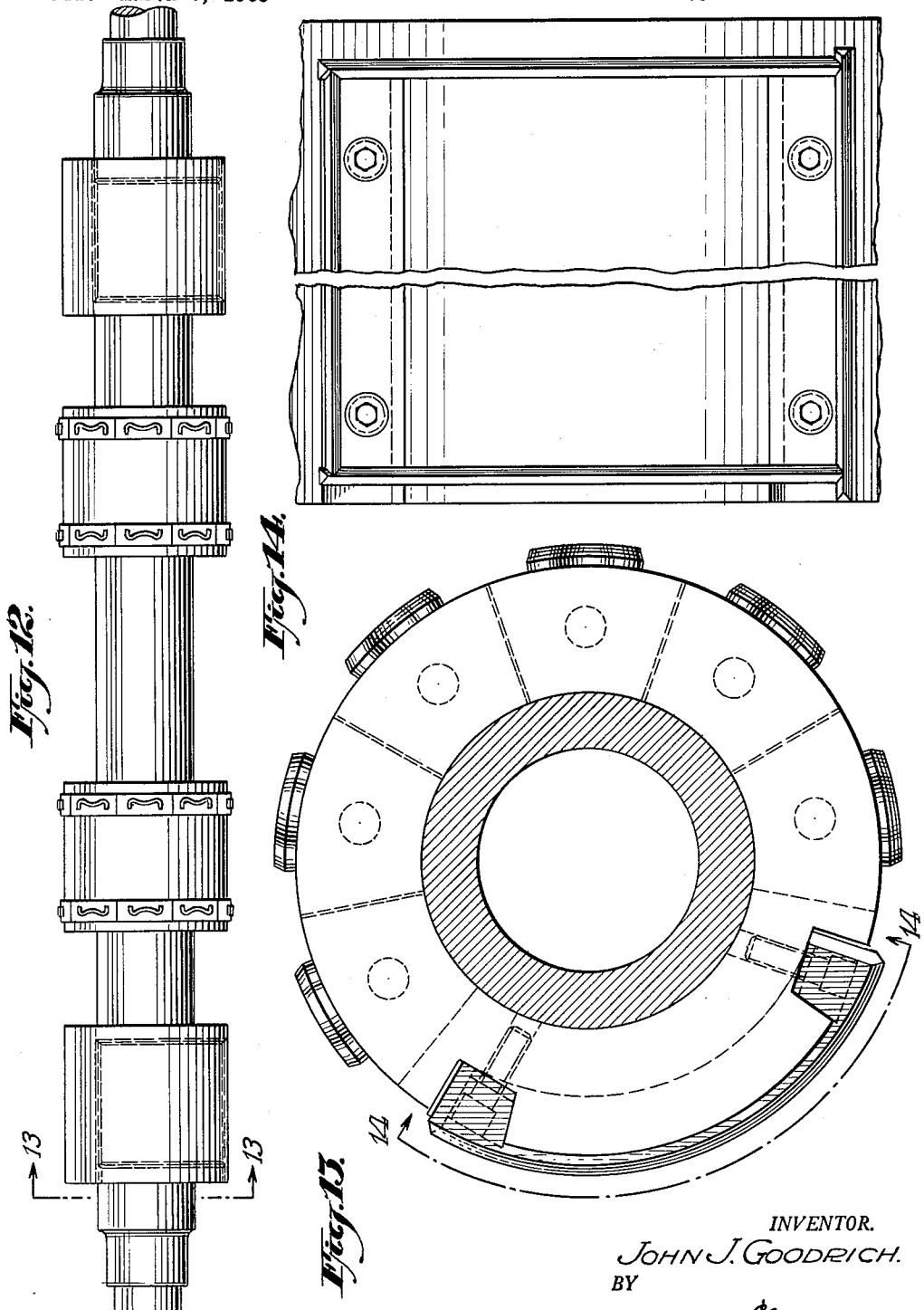
INVENTOR.
JOHN J. GOODRICH.
BY
Ward, Neal, Haselton, Orme & McChannon
ATTORNEYS.

Oct. 27, 1964    J. J. GOODRICH    3,153,991
APPARATUS FOR THE MANUFACTURE OF COMPOSITE CARTON BLANKS
Filed March 4, 1963    11 Sheets-Sheet 8
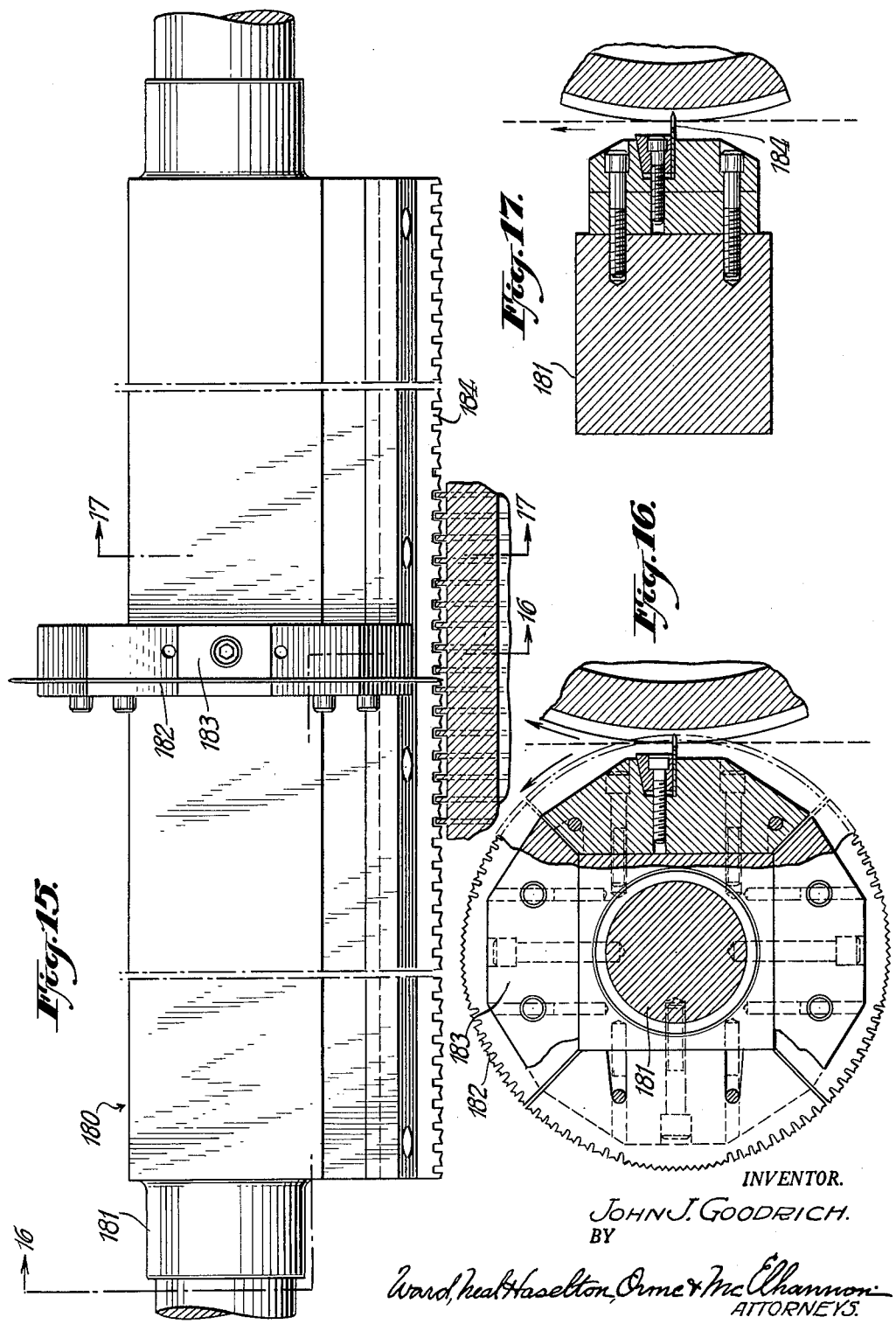
INVENTOR.
John J. Goodrich.
BY
ATTORNEYS.

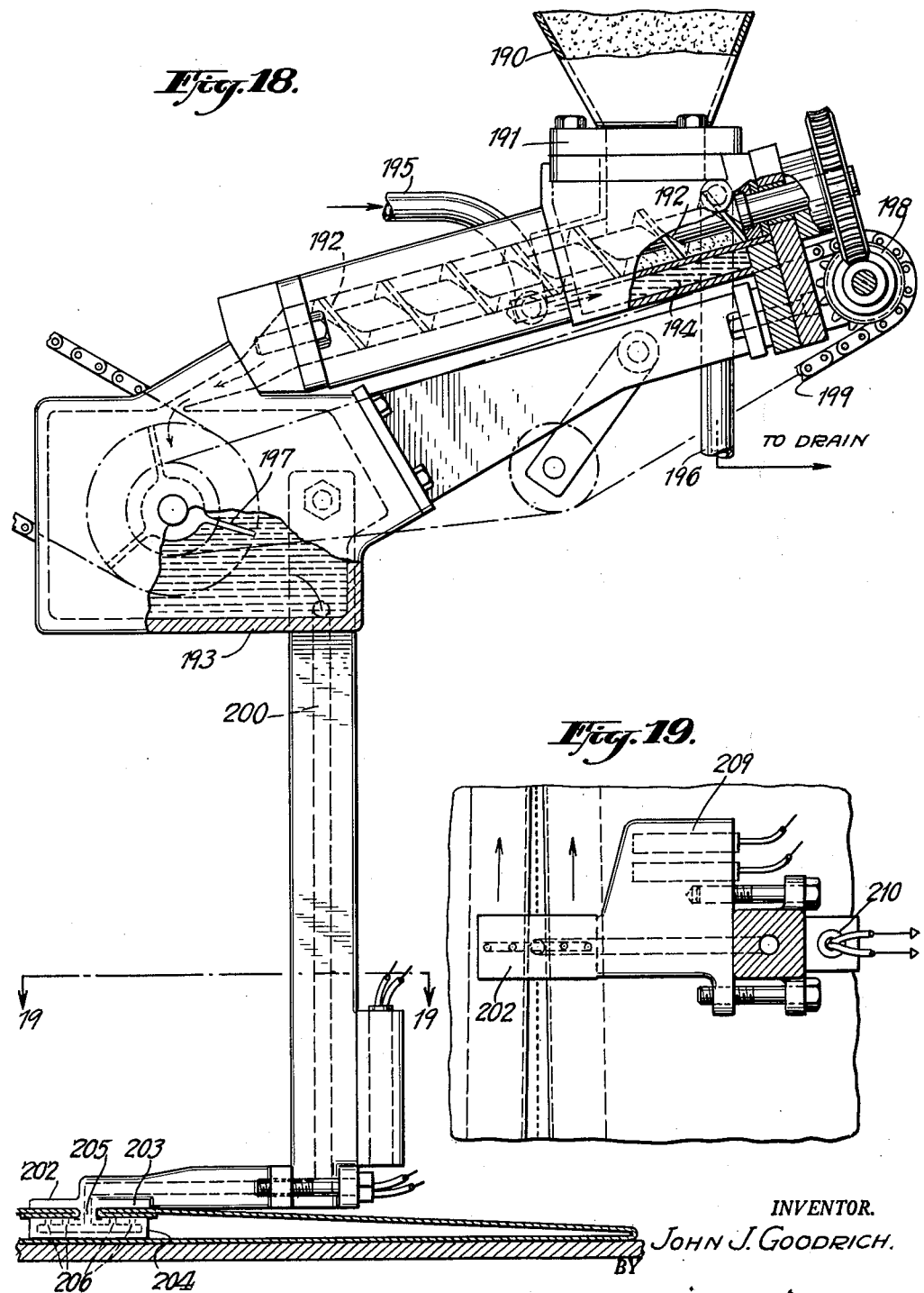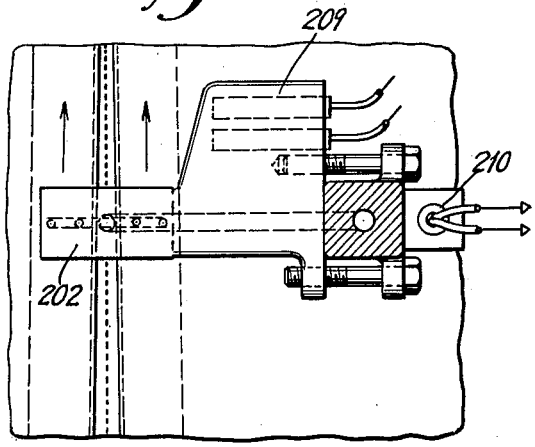

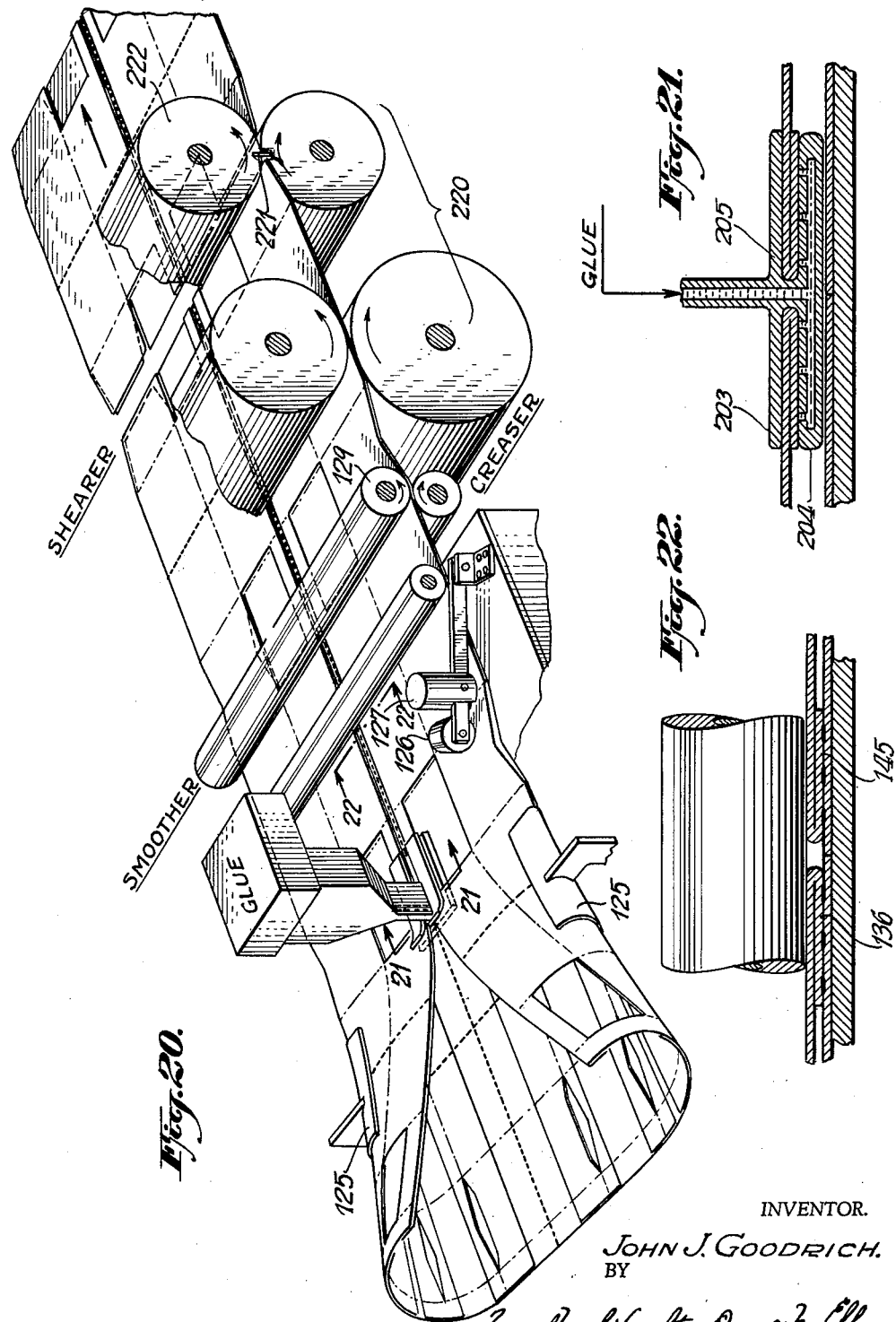

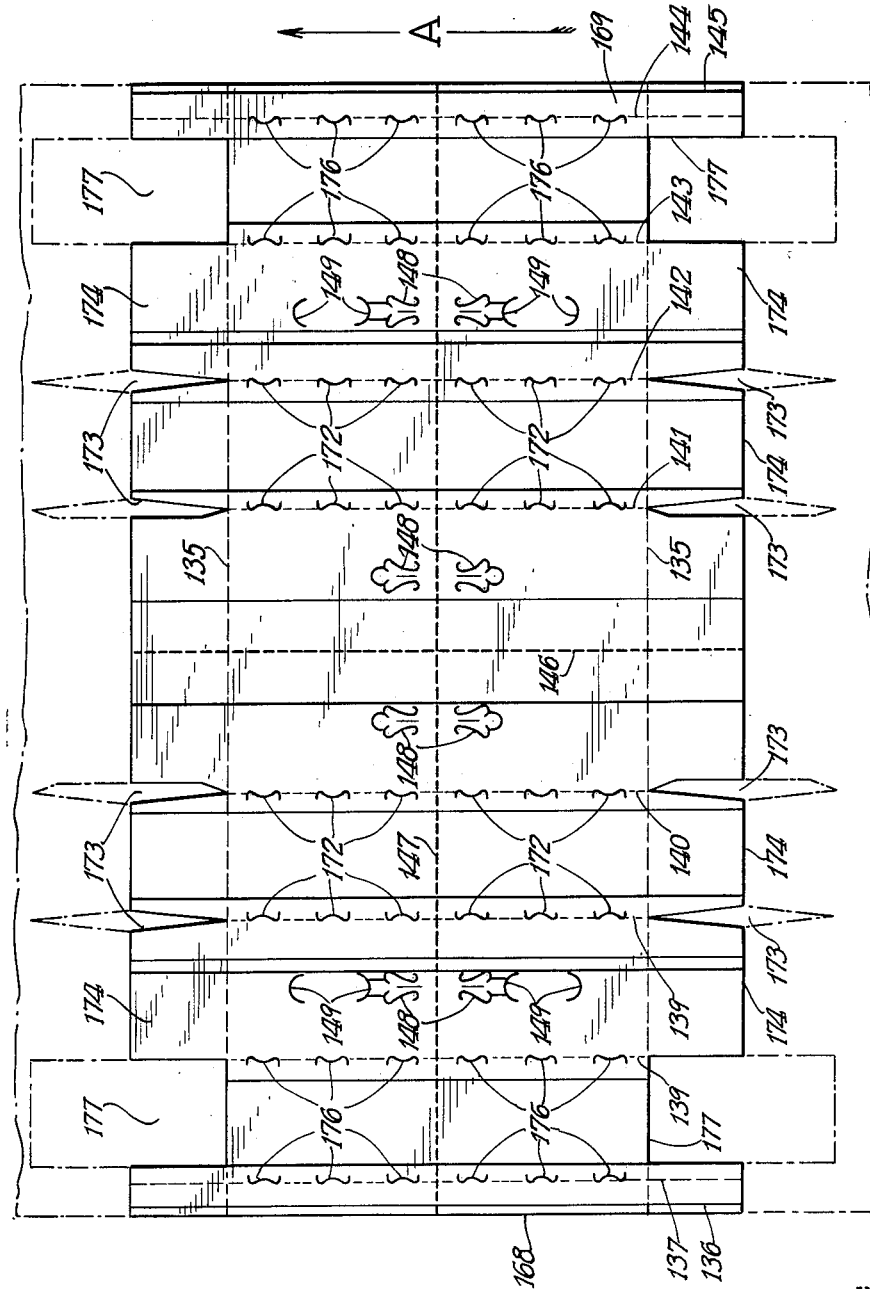

United States Patent Office 3,153,991
Patented Oct. 27, 1964

3,153,991
APPARATUS FOR THE MANUFACTURE OF COMPOSITE CARTON BLANKS
John J. Goodrich, Pensacola, Fla., assignor to St. Regis Paper Company, New York, N.Y., a corporation of New York
Filed Mar. 4, 1963, Ser. No. 262,570
18 Claims. (Cl. 93—48)

This invention relates to packaging machinery and more particularly it concerns apparatus for manufacturing collapsed composite cartons from a single web of a semi-rigid paper type material.

Composite cartons of the type produced by the machinery of the present invention are described in a co-pending application Serial No. 184,971, which was filed on April 4, 1962 and which has been assigned to the assignee of the present invention. A carton constructed according to that invention is capable, in its opened or erected condition, of containing in four separable compartments a total of twenty-four cylindrically shaped subcontainers such as cans, jars or bottles. The individual compartments of the carton are easily separated from the composite unit by tearing along certain perforated lines. Each of these individual compartments when separated, is itself capable of containing six of the individual subcontainers.

One important requirement of such composite cartons is that they be constructed with a high degree of dimensional accuracy. This is necessary because of the unique manner in which they hold their contents; namely by being forced by the subcontainers into a predetermined degree of tension. This keeps the individual subcontainers held tightly together, thus preventing undue stress concentrations and consequent tearing in localized regions of the carton when dropped or struck vigorously. In order for the subcontainers to cause a sufficient degree of tension without actually tearing the carton it is necessary of course that the carton be made with a high degree of accuracy.

According to a feature of the invention, such cartons are made very accurately and at high speed with a minimum of waste. This is accomplished by a proper sequence of pre-cutting, scoring, folding and gluing a continuous web of material into the shape of two adjacent collapsed tubes and then severing these dual tubes into individual case lengths which may readily be erected for loading. In accordance with this procedure, novel means are provided whereby a continuous web of material passes over a battery of cutting and scoring rollers which shape the web into a continuous series of opened carton blanks joined end for end; and which further impart to the web a certain bendability along preselected fold lines for ease in erecting the finished cartons. Other means are provided whereby the outside edges of the web are brought to the center of the web surface and are then individually glued thereto in close proximity to each other. More specifically the outside marginal portions of a moving web are first folded over 180° to produce outer edge flaps on the web. The web is then again folded to bring these outer edge flaps into contact with the surface of the web near its longitudinal center. The web folding means and a unique gluing means cooperate to position the edge flaps in close relationship to the web center and simultaneously to apply an adhesive to the proper side of the flaps so that they may be immediately pressed and secured into position against the web surface to form therefrom a pair of oppositely coiled flattened tubular elements joined at the web center.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIGS. 1a and 1b are schematic illustrations taken in elevation, of a carton manufacturing machine according to the present invention;

FIGS. 2a, 2b, and 2c together illustrate a plan view of the apparatus shown in FIGS. 1a and 1b;

FIG. 3 is an enlarged elevational view of a portion of the device shown in FIG. 1b;

FIG. 4 is a side view of a first cutter element shown in its end view in FIG. 3;

FIG. 5 is a section view taken along lines 5—5 of FIG. 4;

FIG. 6 is a section view taken along lines 6—6 of FIG. 5;

FIG. 7 is a side view of a second cutter element shown in end view in FIG. 3;

FIG. 8 is a section view taken along lines 8—8 of FIG. 7;

FIG. 9 is a view taken along lines 9—9 of FIG. 8;

FIG. 10 is a section view taken along lines 10—10 of FIG. 8;

FIG. 11 is a view taken along lines 11—11 of FIG. 8;

FIG. 12 is a side view of a third cutter element shown in end view in FIG. 3;

FIG. 13 is a section view taken along lines 13—13 of FIG. 12;

FIG. 14 is a section view taken along lines 14—14 of FIG. 13;

FIG. 15 is a side view of a fourth cutter element shown in end view in FIG. 3;

FIG. 16 is a section view taken along lines 16—16 of FIG. 15;

FIG. 17 is a section view taken along lines 17—17 of FIG. 15;

FIG. 18 is an enlarged elevational view, partially in section, of a glue applicator element shown in FIGS. 1b and 2b;

FIG. 19 is a section view taken along lines 19—19 of FIG. 18;

FIG. 20 is an isometric view illustrating the operation of a portion of the present invention;

FIG. 21 is a section view taken along lines 21—21 of FIG. 20;

FIG. 22 is a section view taken along lines 22—22 of FIG. 20; and

FIG. 23 is a plan view of an unglued composite carton blank as it appears during manufacture.

Referring now to FIGS. 1a and 1b there are shown the various stations of a machine in proper positional relation to each other for carrying out the steps of producing container blanks according to the present invention.

A continuous web 100 is withdrawn from a supply roll 101 and passes over various guiding rollers 103 to a printing and/or processing station 104. Here one side of the web may be printed to impart a design or pattern thereon in accordance with a desired finished carton appearance. Also the printing and/or processing station 104 may be adapted for applying to the web various coatings or treatings which serve to impart certain desired strength, water proofing or resilient characteristics.

From the printing and/or processing station 104, the web 100 passes below a number of tape supply rolls 105 to 112. Flexible tapes of fabric, paper or similar material are withdrawn from each of these rolls as the web 100 moves beneath them. These tapes pass through a first adhesive applicator 113 and are then pressed down upon the web 100 and adhesively secured thereto by means of a pair of squeeze rolls 114.

The manner in which the flexible tapes are withdrawn from the various tape supply rolls 105 to 112 and are applied to the continuous web 100 is best shown in the plan view of FIG. 2a. Here the tape supply rolls are shown to be mounted for rotation about axes which are parallel with the longitudinal movement of the continuous web 100. The flexible tapes from these rolls pass over diagonally positioned rollers 115, which are located to position the tapes over various longitudinal corner lines of the web about which the web is eventually to be bent. The adhesive applicator 113 is shown in FIG. 2a to be comprised of a glue applicator roll 116 over which each of the tapes pass prior to being pressed onto the web; and a hot melt adhesive unit 117 which keeps the roll 116 continuously supplied with molten glue.

As shown in FIG. 1b, the web 100, after being taped, passes through a slotter-creaser station 120 where various cutting, piercing, scoring and creasing operations are performed on the web in a manner to be described. The slotter-creaser station operates to shape the web into opened finished carton shapes but does not sever the web into individual units. Thus, the web becomes transformed by the slotter-creaser into a series of integrally connected unfolded and flattened container blanks.

From the slotter-creaser station 120 the web passes beyond a pair of edge flap folders 121 which fold over the outer edges of the web by 180° to form folded over edge flaps on the web. The web in this condition then passes over a main folding station 122 where its prefolded margin edges are brought together near the longitudinal center of the web. The construction and manner of operation of the edge flap folders 121 and main folding station 122 is best illustrated in FIGS. 1b, 2b and 2c. Since the edge flaps are relatively narrow in relation to the longitudinal distances covered by the web in its various processing operations the edge flap folders 121 may simply take the form of scoop shaped elements which roll over and crease the edge portions of the web as it passes by. The main folding station, however, is necessarily more complex because of the rather large width of web material to be folded over. Because of this the main folding station includes a frame member 124 which holds down the center of the web while a pair of scoop shaped main guiding elements 125 roll over the outer edges. These main guiding elements direct the web edges toward the center of upper web surface where they are precisely positioned by glue applicator elements in a manner to be described.

A pair of conically shaped bias rollers 126 are mounted downstream from the scoop shaped main guiding elements 125 and rest on the folded over web portions with their axes of rotation offset relative to the direction of web movement. These bias rollers maintain a continuous frictional pressure on the folded over web portions and cooperate to achieve accurate and rapid positioning of the web elements to be glued. Adjustable weights 127 are provided in connection with each of the bias rollers to control the amount of inwardly directed force generated by the rollers.

Between the scoop shaped main guiding elements and the bias rollers there is located a main glue applicator station 123 where the downwardly facing web edge flaps are coated with adhesive and are guided downwardly in proper relationship to the center of the web. The coated edge flaps are then pressed down by means of smoother and creaser rollers 128 and 129 which cause sealing of the glued flaps and flattening of the web into a pair of collapsed and attached tubular members. The web in this condition then passes through a shearing station 220 which is arranged to cut the flattened tubular configuration into carton lengths at proper intervals. The shearing station is shown in FIG. 2c to comprise a shear rol 221 having mounted transversely thereon a cutter blade 222 which engages a mating blade mounted on a cooperating roll (not shown) to sever the web at proper intervals. The carton blanks then pass over a distribution conveyer 225 where they dispatch either to a storage area or to further stations for erection and loading.

Referring now to FIG. 3, the various elements comprising the slotter-creaser station 120 will be described. As shown in FIG. 3, the web 100 passes through a series of creaser and scoring rollers 130–135 which effect a flexibility and bendability along the various longitudinal corner lines of the web 100. These creasing and scoring rollers are provided with peripheral protrusions at locations coincident with the particular corner lines to be creased or scored. The protrusions interact with corresponding peripheral recessions in cooperating rollers 130′–134′ to effect the desired working and softening of the web corner lines. The web then passes upwardly through the slotter-creaser station 120 between various sets of cutter rollers and cooperating back-up rollers which cut and shape the web into individual but connected carton blank units.

The basic unit shape imparted to the web 100 in the slotter-creaser station 120 is shown in FIG. 23. The longitudinal direction of movement of the web in FIG. 23 is given by an arrow A to the right of the figure. It is to be noted that what is illustrated is merely one unit and at the time the web leaves the slotter-creaser station 120 these units are integrally connected to one another as indicated by the phantom line extensions at either end of the blank. The configurational changes imparted by the slotter-creaser station are seen to include a number of longitudinal scores 136–143 distributed across the web and a longitudinal perforation line 146 centrally of the web. The blank also includes a transverse perforation line 147 as well as a pair of transverse fold lines 135. The erected container blank is formed by bending the web by 90° along each of the score lines, thus forming two adjacent but separable tubular elements connected to each other at the longitudinal perforations 146. The marginal web portions beyond the first and last longitudinal scores, 136 and 145 respectively, form edge flaps 168 and 169 which lie against the upper web surface on their respective sides of the perforated line 146 when the web is bent into tubular configuration and they are glued in place to maintain the tubular shape of the web.

The configuration of FIG. 23 is further seen to include various can lock and finger holes 148 and 149 which are formed therein by means of can lock and finger hole cutter rollers 150 shown in FIG. 3. The construction of the can lock and finger hole rollers is shown in more detail in FIGS. 4, 5 and 6. Here the roller 150 is shown to include a number of displaced disc shaped elements 151–154 having lyre shape cutter protrusions 155 along their outer peripheries. Additional semi-circular protrusions 156 are provided on the outer discs 151 and 154 to provide finger hole cuts in the web 100. As shown in FIG. 5, the disc elements are of composite construction, comprising removable tool blocks 157 mounted in conventional fashion on a central shaft 158 and on which are supported cutter elements 159 which are formed with the various cutter protrusions 155 and 156. The shape and arrangement of the can lock and finger holes are shown in more detail in FIG. 6.

Referring again to the opened carton blank of FIG. 23, it will be noted that along certain of the longitudinal score lines, namely those designated as 139, 140, 141 and 142, there are located a series of chine holes 172 in the center portion of the blank as well as triangularly shaped slots 173 at the extremities thereof. The chine openings provide access for securing and locking can shaped subcontainers in the erected carton while the triangular shaped slots serve to form the extremities of the blank into overlapping tabular elements 174 for covering the canned containers and securing them in place when the carton is loaded. The chines and slots are produced by means of slotter and chine cutter roll 160 shown in FIG. 3. The configuration of the slotter and chine cutter roll is shown more clearly in FIGS. 7-11. This roll is seen to be comprised of a keyed shaft 161 upon which various cutter discs 162 are mounted in proper transverse relation to one another and which contain as their periphery various shaped cutter protrusions 163 and 164 in proper rotational relationship to each other. This provides the necessary displacement of chines to slots as shown in FIG. 23. The construction of the disc shaped cutter elements is shown in FIG. 8 and will be seen to be similar to the construction of the can lock and finger hole cutter elements of FIG. 5. Here the cutter discs each include removable tool blocks 165 which are secured to the shaft 161 as shown in FIG. 10; and upon which are mounted various cutter elements 166 containing the slot and chine producing cutter protrusions 163 and 164 as shown in FIGS. 9 and 11.

Again referring to FIG. 23 it will be noted that additional chines 176 and panel cutout shapes 177 are provided in the vicinity of the remaining longitudinal score lines 137, 138, 143 and 144 respectively. These cutout elements are produced by means of a panel cutout and inside chine cutter roller 170. Such cutter roller is shown in more detail in FIGS. 12-14, and is seen to be of the same general construction as the cutter rollers already described.

The longitudinally perforated line 146 and the transversely perforated line 147 are produced by means of a perforation cutter 180 which in turn is shown in more detail in FIGS. 15-17. This cutter includes a cutter shaft 181 having mounted thereon a disc shaped serrated blade 182 which generates the longitudinal perforations 146. The serrated blade is mounted in the usual manner, as shown in FIG. 16, by bolting blade segment carrying tool blocks 183 to the shaft 181 itself. A longitudinally extending serrated blade 184 is also connected to the shaft 181 in the manner shown in FIG. 17 to produce the transversely perforated line 147.

The main glue applicator station 123 is most clearly shown in FIG. 18. Here a heat meltable adhesive is processed in a manner giving it optimum fluidity at the precise time and proper location for immediate and positive adhesion of the portions of the container blank to be joined. This provides maximum strength at the joined edges with a minimum of waste.

As shown in FIG. 18 there is provided a hopper 190 into which a heat meltable adhesive compound is poured at room temperature in a dry or granular state. The adhesive passes through the hopper into an upper housing 191 where it is driven by means of a screw conveyor 192 to an agitator tank 193. The upper housing 191 is provided with a water jacket 194 surrounding the screw conveyor. Inlet and outlet means 195 and 196 connect the water jacket to a source (not shown) of hot water which heats and melts the adhesive as it proceeds toward the agitator tank 193. The fluid adhesive is maintained in a homogeneous condition by means of a moving paddle shaped agitator 197 element located in the agitator tank. The screw conveyors 192 and the paddle shaped agitator 197 are driven through sprockets 198 and chains 199 from a source of rotation power (not shown).

Molten adhesive from the agitator tank 193 passes downwardly through a tubular passageway 200 to an applicator element 202. The glue applicator element 202 includes upper and lower transversely extending plates 203 and 304 joined by means of a hollow upright central portion 205 which is connected to the tubular passageway 200. As shown in FIG. 18, during operation of the glue applicator station the folded over edge flaps 168 and 169 of the web, proceed in the slotted space between the upper and lower plate elements of the glue applicator element 202. This holds the edge flaps and other portions of the web in proper positional relationship to each other while adhesive is being applied thereto. The lower plate 204 is hollow and includes passageways 206 which open at the upper surface of the plate on each side of the upright central portion 205. The upright central portion in turn connects the hollow lower plate 204 to the tubular passageway 200 so that as the web proceeds past the glue applicator element the sides of the flap portions facing the center of the upper web surface receive an even coating of molten adhesive just prior to being pressed down on to the web forming a uniform and secure bond.

Referring now to FIG. 19 the lower passageway will be seen to be provided with a second water jacket 207 having inlet and outlet means 208 and 209 connected to a source of hot water (not shown). Also provided in the lower portion of the passageway 200 are thermostat means 210 which detect the temperature of the molten adhesive and control the flow of hot water accordingly so as to insure precise and proper maintenance of adhesive temperature at the instant it is applied to the flap portions of the web.

The manner in which the web holding elements and the glue applicator cooperate to insure efficient and rapid as well as accurate forming of the flattened container blanks is best shown in the perspective view of FIG. 20. Here the taped, precut and precreased web 100 is shown as it proceeds past the main folding station and the glue applicator station. As shown in this figure the scooped shaped main guiding elements 125 as well as bias rollers 126 urge the folded over web inwardly so that its folded marginal edges are maintained between the upper and lower plates of the glue applicator element while glue is applied to the underside of the edge flap portions of the web in the manner described. The smoother and creaser rollers, 128 and 129, immediately downstream from the glue applicator station, press the freshly glued portions of the web together in their proper positional relationship to each other so that an accurate and smooth joint is achieved.

FIGURES 21 and 22 illustrate the manner in which the web edge flaps are precisely guided by the glue applicator 123 while receiving a uniform coating of adhesive so that upon passing between the creaser rollers 128 they become positioned against the upper web surface in their proper location without any delay or any sliding thereagainst.

It will readily be appreciated by those skilled in the art to which the subject invention pertains that there has been described a forming means for producing a complex glued joint at rates and with a degree of accuracy not heretofore considered possible. It will further be appreciated that because of the unique cooperation between the glue applicator and the main web folding elements whereby the web edge flaps are precisely guided by the glue applicator structure while the web folding elements merely urge the edge flaps toward the glue applicator, such high speed and relatively complex gluing operation can be carried out in spite of the varied and uneven configuration imported to the web in the slotter-creaser station 120.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. A machine for producing flattened composite carton blanks, said machine comprising, means for guiding a continuous web of flexible sheet material as it is withdrawn from a supply roll, shaping means arranged to form the withdrawn web into the shape of a series of unfolded composite carton blanks integrally connected end to end, first folding means located downstream from said shaping means and including a guide means operative to bend over both marginal edges of said web about corresponding longitudinally extending marginal edge corner fold lines and to press said marginal edges flat against the same web surface, second folding means located downstream from said first folding means and arranged to bend over said web in a manner bringing the corner fold lines of said marginal edges in toward the longitudinal center of said same web surface, an adhesive dispensing means associated with said second web folding means for applying an adhesive to the sides of the marginal edges which come towards said same web surface near its longitudinal center, pressing and creasing means downstream from said adhesive dispensing means for forming the folded over web into a pair of collapsed attached tubes, and shear means for transversely severing said collapsed attached tubes into individual carton lengths.

2. A machine for producing flattened composite carton blanks, said machine comprising, means for guiding a continuous web of flexible material as it is withdrawn from a supply roll, shaping means arranged to form the withdrawn web into the shape of a series of unfolded composite carton blanks integrally connected end to end, said shaping means including eight creaser rollers peripherally formed to impart by rolling against said web a series of longitudinal corner fold lines transversely displaced in symmetrical arrangement about the longitudinal center of said web and including outer marginal edge fold lines, second corner fold lines approximately midway of said marginal edge corner fold lines in the longitudinal center of said web and third and fourth corner lines spaced inwardly toward said longitudinal center from said marginal edge corner fold lines and said second corner fold lines respectively by an equal amount, first folding means located downstream from said shaping means and including a guide means operative to bend over both marginal edges of said web about said outer marginal edge fold lines and to press said marginal edges flat against the same web surface, second folding means located downstream from said first folding means and arranged to bend over said web in a manner bringing said marginal edge corner fold lines in toward the longitudinal center of said same web surface, an adhesive dispensing means associated with said second folding means for applying an adhesive to the sides of the marginal edges which come toward said same web surface near its longitudinal center, pressing and creasing means downstream from said adhesive dispensing means for forming the folded over web into a pair of collapsed attached tubes, and shear means for transversely severing said collapsed attached tubes into individual carton lengths.

3. A machine for producing flattened composite carton blanks, said machine comprising, means for guiding a continuous web of flexible material as it is withdrawn from a supply roll, shaping means for imparting selected cuts and creases to the moving web to form the web into the shape of a series of unfolded carton blanks integrally connected end to end, said shaping means including creaser rollers peripherally formed to impart by rolling against said web a series of longitudinally creased corner fold lines, means upstream from said shaping means for adhesively attaching flexible tapes along said longitudinal corner lines on one side of said web, first folding means located downstream from said shaping means and including a guide means operative to bend over both marginal edges of said web about corresponding longitudinally extending marginal edge corner fold lines and to press said marginal edges flat against the same web surface, second folding means located downstream from said first folding means and arranged to bend over said web in a manner bringing the corner fold lines of said marginal edges in toward the longitudinal center of said same web surface, an adhesive dispensing means associated with said second folding means for applying an adhesive to the sides of the marginal web edges which come toward said same web surface near its longitudinal center, pressing and creasing means downstream from said adhesive dispensing means for forming the folded over web into a pair of collapsed attached tubes, and shear means for transversely severing said collapsed attached tubes into individual carton lengths.

4. The machine described in claim 3 wherein said means for adhesively attaching flexible tapes includes a plurality of tape supply spools mounted with their respective axes in alignment and parallel to the direction of movement of said web, individual diagonally offset roller means associated with each of said tape containing spools and positioned to guide tape withdrawn from their respective spools into alignment with various transversely displaced longitudinal lines along said web, and means for adhesively adhering said tapes to their respective positions on said web.

5. The machine described in claim 4 wherein said last mentioned means includes an adhesive applying element extending transversely across said web between said web and said tapes downstream from said diagonally offset roller means, and further roller means pressing said tapes against said adhesive applying element and onto said web.

6. A machine for producing flattened composite carton blanks, said machine comprising, means for guiding a continuous web of flexible sheet material as it is withdrawn from a supply roll, shaping means including a plurality of cutter discs arranged to roll along the surface of the moving web at various transversely displaced positions, said cutter discs having cutter protrusions extending peripherally therefrom to impart to the moving web successive series of cutout shapes, said shaping means further including creaser rollers peripherally formed to impart by rolling against said web a series of longitudinal creased corner fold lines, means upstream from said shaping means for adhesively attaching flexible tapes along said longitudinal corner lines on one side of said web, first folding means located downstream from said shaping means and including a guide means operative to bend over both marginal edges of said web about corresponding longitudinally extending marginal edge corner fold lines and to press said marginal edges flat against the same web surface, second folding means located downstream from said first folding means and arranged to bend over said web in a manner bringing the corner fold lines of said marginal edges in toward the longitudinal center of said same web surface, an adhesive dispensing means associated with said second folding means for applying an adhesive to the sides of the marginal web edges which come toward said same web surface near its longitudinal center, pressing and creasing means downstream from said adhesive dispensing means for forming the folded over web into a pair of collapsed attached tubes, and shear means for transversely severing said collapsed attached tubes into individual carton lengths.

7. The machine described in claim 6 wherein said shaping means includes a peripherally serrated disc arranged to impart longitudinal perforations centrally of said web.

8. The machine described in claim 7 wherein said shaping means further includes a serrated blade extending crossways of said web and arranged to impart transverse perforations at preselected locations on said web.

9. A machine for producing flattened composite carton blanks, said machine comprising, means for guiding a continuous web of flexible material as it is withdrawn from a supply roll, shaping means including eight creaser rollers peripherally formed to impart by rolling against said web a series of longitudinally extending corner fold lines transversely displaced in symmetrical arrangement about the longitudinal center of said web and including outer marginal edge corner fold lines, second corner fold lines approximately midway of said marginal edge corner fold lines in the longitudinal center of said web and third and fourth corner fold lines spaced inwardly toward said longitudinal center from said marginal edge corner fold line and said corner fold lines respectively by an equal amount, said shaping means further including a plurality of cutter discs arranged to roll along the surface of the moving web at varoius transversely displaced positions, said cutter discs each having a circumference equal to a carbon length and having cutter protrusions extending peripherally therefrom to impart to the moving web a successive series of cutout shapes including can holding corner chines intermediate end tab forming cutouts along each of said longitudinal corner fold lines and lyre shaped can lock cuts midway between said second and third longitudinal corner fold lines and midway between said fourth longitudinal corner fold lines and the longitudinal center of said web, means upstream from said shaping means for adhesively attaching flexible tapes along said longitudinal corner lines on one side of said web, first folding means located downstream from said shaping means and including a guide means operative to bend over both marginal edges of said web about corresponding longitudinally extending marginal edge corner fold lines and to press said marginal edges flat against the same web surface, second folding means located downstream from said first folding means and arranged to bend over the said web in a manner bringing the corner fold lines of said marginal edges in toward the longitudinal center of said same web surface, an adhesive dispensing means associated with said second folding means for applying an adhesive to the sides of the marginal web edges which come toward said same web surface near its longitudinal center, pressing and creasing means downstream from said ahesive dispensing means for forming the folded over web into a pair of collapsed attached tubes, and shear means for transversely severing said collapsed attached tubes into individual carton lengths.

10. A machine for producing flattened composite carton blanks, said machine comprising, means for guiding a continuous web of flexible material as it is withdrawn from a supply roll, shaping means for imparting selected cuts and creases to the moving web to form the web into the shape of a series of unfolded carton blanks integrally connecting end to end, said shaping means including creaser rollers peripherally formed to impart by rolling against said web a series of longitudinally creased corner fold lines, first folding means located downstream from said shaping means and including a guide means operative to bend over both marginal edges of said web about corresponding longitudinally extending marginal edge corner fold lines and to press said marginal edges flat against the same web surface, second folding means located downstream from said first folding means and arranged to bend over said web in a manner bringing the corner fold lines of said marginal edges in toward the longitudinal center of said same web surface, an adhesive dispensing means associated with said second folding means for applying an adhesive to the sides of the marginal web edges which face said same web surface as they are folded over and brought in toward its longitudinal center, said adhesive dispensing means including web edge guiding means arranged to guide the folded over web edges down on to the web surface in alignment with its longitudinal center and simultaneously to apply a coating of adhesive to said folded over web edges, pressing and creasing means downstream from said adhesive dispensing means for forming the folded over web into a pair of collapsed attached tubes, and shear means for transversely severing said collapsed attached tubes into individual carton blanks.

11. A machine for producing flattened composite carton blanks, said machine comprising, means for guiding a continuous web of flexible material as it is withdrawn from a supply roll, shaping means for imparting selected cuts and creases to the moving web to form the web into the shape of a series of unfolded carton blanks integrally connecting end to end, said shaping means including creaser rollers peripherally formed to impart by rolling against said web a series of longitudinally creased corner fold lines, first folding means located downstream from said shaping means and including a guide means operative to bend over both marginal edges of said web about corresponding longitudinally extending marginal edge corner fold lines and to press said marginal edges flat against the same web surface, second folding means located downstream from said first folding means and arranged to bend over said web in a manner bringing the corner fold lines of said marginal edges in toward the longitudinal center of said same web surface, and adhesive dispensing means associated with said second folding means for applying an adhesive to the sides of the marginal web edges which face said same web surface as they are folded over and brought in toward its longitudinal center, said adhesive dispensing means including an applicator element positioned centrally of the moving web immediately above said same web surface and a supply conduit extending upwardly therefrom, the outer sides of said supply conduit immediately above said applicator element providing guiding abutments for the folding over web edges, pressing and creasing means downstream from said adhesive dispensing means for forming the folded over web into a pair of collapsed attached tubes and shear means for transversely severing said collapsed attached tubes into individual carton lengths.

12. A machine for producing flattened composite carton blanks, said machine comprising, means for guiding a continuous web of flexible material as it is withdrawn from a supply roll, shaping means for imparting selected cuts and creases to the moving web to form the web into the shape of a series of unfolded carton blanks integrally connected end to end, said shaping means including creaser rollers peripherally formed to impart by rolling against said web a series of longitudinally creased corner fold lines, means upstream from said shaping means for adhesively attaching flexible tape along said longitudinally creased corner lines on the upper side of said web, first folding means located downstream from said shaping means and including a guide means operative to bend both marginal edges of said web upwardly about corresponding longitudinally extending marginal edge corner fold lines and to press said marginal edges flat against the upper web surface, second folding means located downstream from said first folding means, said second web folding means including guiding elements arranged to bend the outer edges of the web upwardly and to guide the corner fold lines of said marginal edges toward the longitudinal center of the upper surface of the web, an adhesive dispensing means including a hollow applicator plate which rests immediately above the longitudinal center of the upper surface of the moving web, a hollow supply element extending directly upwardly from the hollow applicator plate and providing support therefor, the outer surfaces of said supply conduit being located immediately above and on each side of the longitudinal center of said web to provide a guiding abutment for the marginal corner fold lines of the web as the second folding means bends over said web toward its longitudinal center, pressing and creasing means downstream from said adhesive dispensing means for forming over the web into a pair of collapsed attached tubes, and shear means for transversely severing said collapsed attached tubes into individual carton lengths.

13. A machine for producing flattened composite carton blanks, said machine comprising, means for guiding a continuous web of flexible material as it is withdrawn from a supply roll, shaping means for imparting selected cuts and creases to the moving web to form the web into the shape of a series of unfolded carton blanks integrally connected end to end, said shaping means including creaser rollers peripherally formed to impart by rolling against said web a series of longitudinally creased corner fold lines, means upstream from said shaping means for adhesively attaching said tapes along said longitudinal corner lines on one side of said web, first folding means located downstream from said shaping means and including a guide means operative to bend over both marginal edges of said web about corresponding longitudinally extending marginal edge corner fold lines and to press said marginal edges flat against the same web surface, second folding means located downstream from said first folding means and arranged to bend over said web in a manner bringing the corner fold lines of said marginal edges in toward the longitudinal center of said same web surface, an adhesive dispensing means comprising a hollow plate supported immediately above the longitudinal center of said same web surface by a supply conduit in communication with the interior of said hollow plate, said supply conduit extending upwardly from the center of said hollow plate to a flowable adhesive supply means, said hollow plate having adhesive outlet ports on its upper surface on either side of said supply conduit, means associated with said second folding means for guiding the folded over marginal edges of said web down onto the upper surface of said hollow plate whereby said marginal edges wipe over said hollow plate and receive a coating of adhesive therefrom, pressing and creasing means downstream from said adhesive dispensing means for forming the folded over web into a pair of collapsed attached tubes and shear means for transversely severing said collapsed tubes into individual carton lengths.

14. A machine for producing flattened composite carton blanks, said machine comprising, means for guiding a continuous web of flexible material as it is withdrawn from a supply roll, shaping means for imparting selected cuts and creases to the moving web to form the web into a series of unfolded carton blanks integrally connected end to end, said shaping means including creaser rollers peripherally formed to impart by rolling against said web a series of longitudinally creased corner fold lines, means upstream from said shaping means for adhesively attaching flexible tapes along said longitudinal corner lines alongside of said web, first folding means located downstream from said shaping means and including a guide means operative to bend over both marginal edges of said web about corresponding longitudinally extending marginal edge corner fold lines and to press said marginal edges flat against the same web surface, second folding means located downstream from said first folding means and arranged to bend over said web in a manner bringing the corner fold lines of said marginal edges in toward the longitudinal center of said same web surface, an adhesive dispensing means comprising a flowable adhesive supply means connected through a supply conduit to a hollow plate supported by said supply conduit immediately above the longitudinal center of said same web surface, said hollow plate having adhesive outlet ports on its upper surface on either side of the longitudinal center of said web bias roller means immediately downstream of said adhesive dispensing means and arranged to rest upon the folded over web to urge the fold lines of said marginal edges down and in toward the longitudinal center of said web whereby said marginal edges wipe over said hollow plate and receive a coating of adhesive therefrom, pressing and creasing means downstream from said bias rollers for forming the folded over web into a pair of attached collapsed tubes, and shear means for transversely severing said collapsed attached tubes into individual carton lengths.

15. A machine for producing flattened composite carton blanks, said machine comprising, means for guiding a continuous web of flexible material as it is withdrawn from a supply roll, shaping means for imparting selected cuts and creases to the moving web to form the web into the shape of a series of unfolded carton blanks integrally connected end to end, said shaping means including creaser rollers peripherally formed to impart by rolling against said web a series of longitudinally creased corner fold lines, means upstream from said shaping means for adhesively attaching flexible tapes along said longitudinal corner lines and alongside of said web, first folding means located downstream from said shaping means and including guide means operative to bend over both marginal edges of said web about corresponding longitudinally extending marginal edge corner fold lines and to press said marginal edges flat against the same web surface, second folding means located downstream from said first folding means and arranged to bend over said web in a manner bringing the corner fold lines of said marginal edges in toward the longitudinal center of said same web surface, an adhesive dispensing means comprising a flowable adhesive supply means connected through a supply conduit to a hollow plate supported by said supply conduit immediately above the longitudinal center of said same web surface said supply conduit extending centrally from said hollow plate in an upward direction, said hollow plate having adhesive outlet ports on its upper surface on either side of the longitudinal center of said web, a solid plate supported by said supply conduit immediately above said hollow plate to form therewith slots on either side of said supply conduit for receiving the folded over web edges, biased roller means immediately downstream of said adhesive dispensing means and arranged to rest upon the folded over web to urge the fold lines of said marginal edges into the slots formed by said hollow plate, said solid plate and said supply conduit whereby said marginal edges wipe over said hollow plate and receive a coating of adhesive therefrom, pressing and creasing means downstream from said adhesive dispensing means for forming the folded over web into a pair of collapsed attached tubes, and shear means for transversely severing said attached collapsed tubes into individual carton lengths.

16. The apparatus described in claim 11 wherein said adhesive dispensing means includes a hopper for receiving heat meltable adhesive in granular form, and further including a screw type conveyor extending from said hopper said screw type conveyor being provided with a heating means for melting adhesive as it is transferred out of said hopper said screw type conveyor being in communication with said supply conduit.

17. A machine for producing flattened composite carton blanks, said machine comprising, means for imparting selected cuts and creases to a moving web to form the web into a series of unfolded carton blanks integrally connected end to end, first folding means adapted to receive said web from said shaping means and including guide means operative to bend over both marginal edges of said web about corresponding longitudinally extending marginal edge corner fold lines and to press said marginal edges flat against the same web surface, second folding means adapted to receive the web from said first folding means and operative to bend over said web in a manner bringing the corner fold lines of said marginal edges in toward the longitudinal center of said same web surface, an adhesive dispensing means comprising a hopper for receiving adhesive in its granulated state, said hopper being connected via a screw type conveyor to a liquid adhesive container, a hot water jacket surrounding said screw conveyor means and adapted to circulate therein hot water for melting said granulated adhesive, a hollow plate supported by and in communication with said liquid adhesive container via a passage means such that said hollow plate is maintained flat against and immediately above the longitudinal center of said same side of said web as said web proceeds from said second folding means, a solid plate supported by said supply passage means immediately above said hollow plate to form therewith slots on either side of said supply passage, said slots being adapted to receive the folded over web edges, a pair of tapered rollers arranged to ride upon the folded over web in the vicinity of said slots and mounted in a manner causing said web to be urged inwardly into said slots whereby said marginal edges wipe over said hollow plate and receive a coating of adhesive therefrom, pressing and creasing means downstream from said adhesive dispensing means for forming the folded over web into a pair of attached collapsed tubes and shear means for transversely severing said attached collapsed tubes into individual carton lengths.

18. The apparatus described in claim 17 further including agitator means for maintaining the liquid adhesive in said container in a relatively homogeneous state.

References Cited in the file of this patent

UNITED STATES PATENTS

| | | |
|---|---|---|
| 1,123,945 | Staude | Jan. 5, 1915 |
| 2,783,693 | Felber | Mar. 5, 1957 |
| 2,799,211 | Zerlin et al. | July 16, 1957 |
| 2,898,816 | Keely | Aug. 11, 1959 |
| 3,105,419 | LaBombard | Oct. 1, 1963 |